INVENTORS
JOHN H. ROHRBAUGH,
CHARLES PINE &
WILLIAM G. ZOELLNER
BY
ATTORNEY

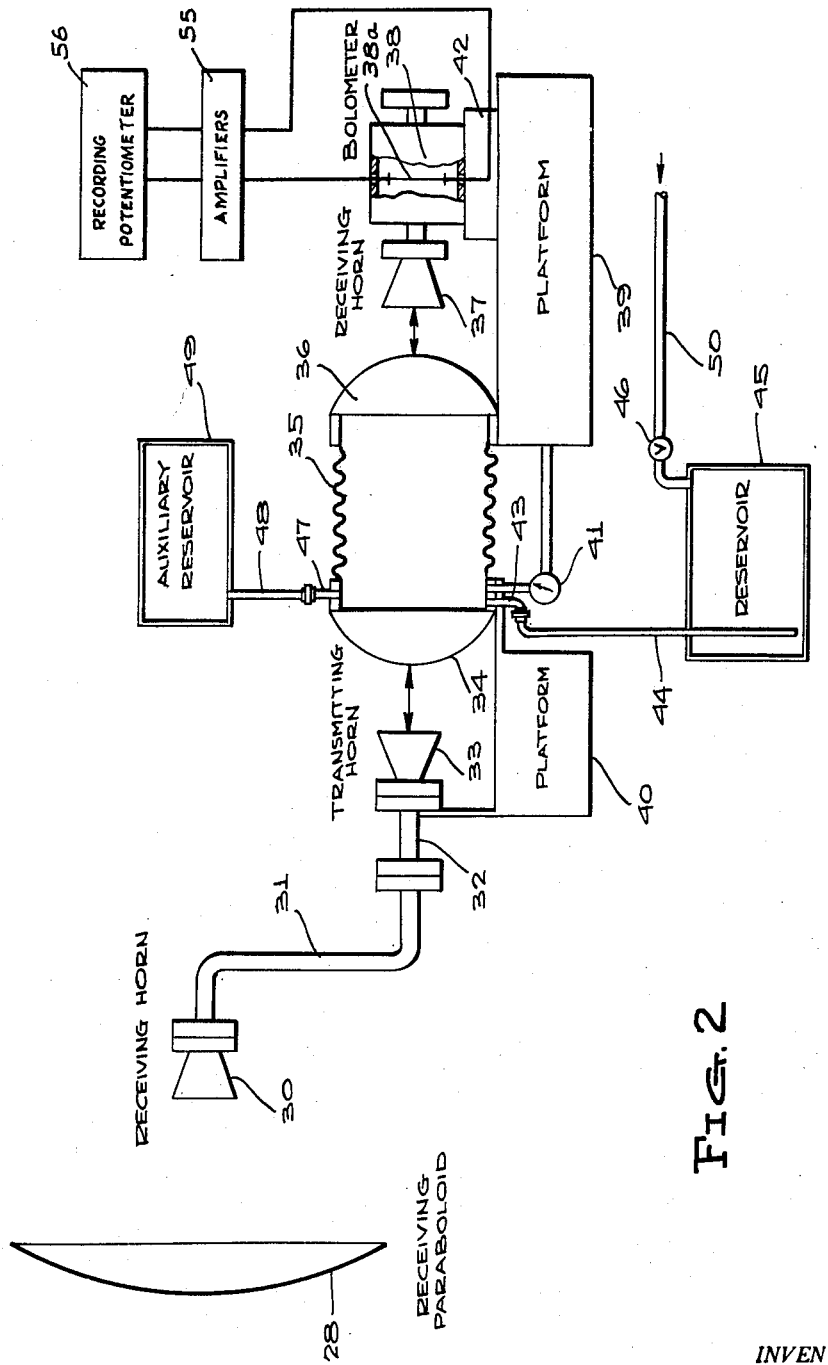

United States Patent Office 2,912,643
Patented Nov. 10, 1959

2,912,643

METHOD FOR DETERMINING COMPLEX INDEX OF LIQUID REFRACTION AND APPARATUS THEREFOR

John H. Rohrbaugh, Kew Gardens, N.Y., and Charles Pine, Kearny, and William G. Zoellner, East Orange, N.J.

Application November 7, 1955, Serial No. 545,462

7 Claims. (Cl. 324—58.5)

This invention relates to a method for determining complex index of refraction of liquid and apparatus therefor.

An object of the present invention is to provide a method for determining complex index of liquid refraction which enables the calculation of the extinction coefficient for the liquid to be made without the necessity for the simultaneous calculation of the refractive index of the liquid.

Another object of the present invention is to provide a method for determining complex index of liquid refraction which enables the calculation of the extinction coefficient for the liquid and the determination of the refractive index of the liquid to be made independently of each other.

A further object of the present invention is to provide a method for determining complex index of liquid refraction which enables the calculation of the extinction coefficient for the liquid without dependence upon a prior knowledge of the extinction coefficient of the material employed in the containing walls.

A still further object of the present invention is to provide an apparatus for determining complex index of liquid refraction which is simple, positive in action, and practical in application.

Other objects and advantages of the present invention will become apparent from the following description taken in conjunction with the accompanying drawings, in which:

Figure 2 is a diagrammatic illustration of another form of apparatus, parts broken away and in section, for carrying out the present invention.

Figure 1:
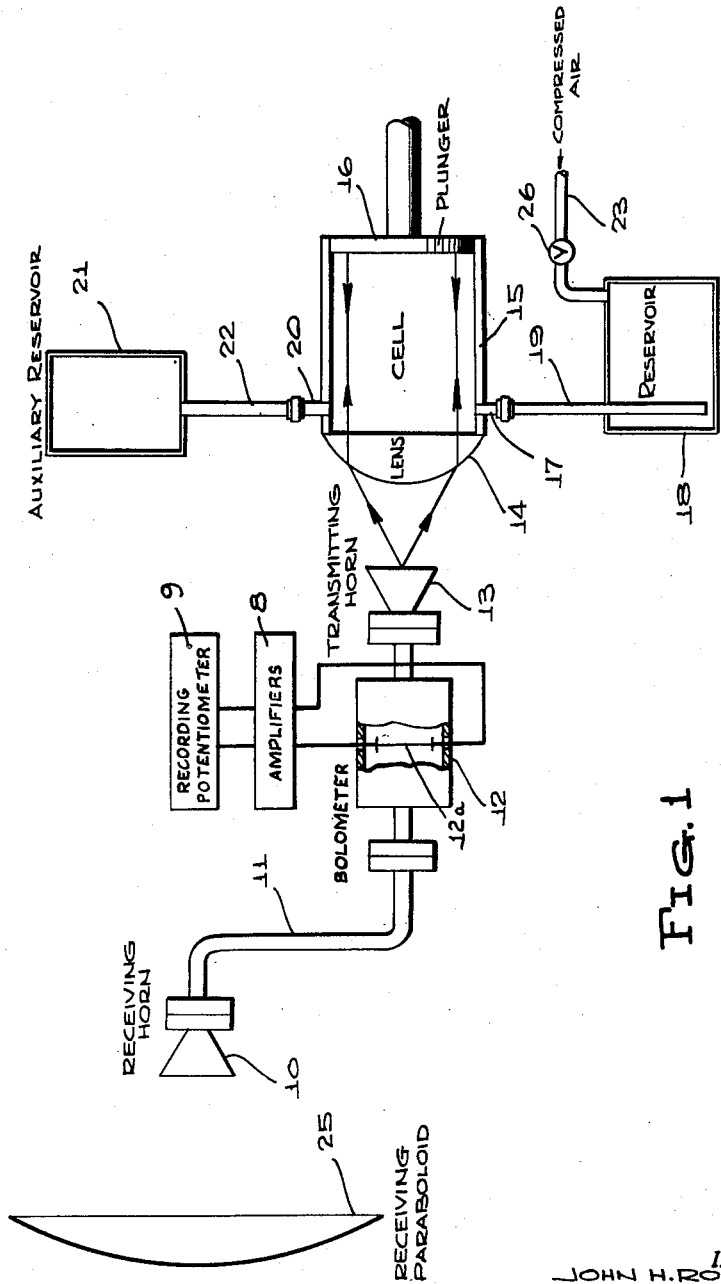
Figure 1 is a diagrammatic illustration of an apparatus, parts broken away and in section, for carrying out the present invention.

Referring to Figure 1 of the drawings, the numeral 10 indicates a first receiving horn for introducing any radiation into the device. The radiation which may be employed is electromagnetic radiation such as that from magnetrons, klystrons. The horn 10 is attached to one end of a wave guide or tunnel in the form of a hollow rectangular pipe 11, the other end of the pipe being connected in communication with a transmission bolometer 12. The Wollaston wire 12a of the bolometer 12 is electrically connected through an amplifier 8 to a recording potentiometer 9. The wave guide or pipe 11 is made of metal such as copper, silver or like metals which are good conductors of electricity. As shown, a receiving paraboloid 25 is employed for introducing the radiation into the receiving horn 10. The bolometer 12 is connected in communication with a second horn 13 which is employed to serve as a transmitting horn, the large end of the horn being in face to face spaced alignment with a plano-convex lens 14. The lens 14 closes one end of a cell 15 which is adapted to contain the liquid to be measured. The cell 15 has its other end normally closed by a plunger 16 which is mounted in the cell for sliding back and forth movement relative to the lens 14, the movement of the plunger being effected by conventional means, not shown. The plunger 16, preferably should be made of a good reflecting material, such as a metal of high conductivity. The cell 15 has an inlet 17 which is connected to a reservoir 18 by means of a conduit 19, the reservoir containing a quantity of the liquid to be measured. In addition, the cell 15 is also provided with an outlet 20 which is connected to an auxiliary reservoir 21 by means of a conduit 22.

While the thus described apparatus includes the receiving paraboloid 25 for introducing the radiation into the receiving horn 10, this radiation may be introduced into the wave guide or pipe 11 by means other than the paraboloid 25 and the cooperating horn 10.

In operation of the thus described apparatus, with the cell 15 empty and the plunger 16 in its normal position of closing the other end thereof the cell 15 is adjusted relative to the transmitting horn 13 until the lens 14 will refract radiation into the cell 15 which is substantially parallel to the axis of the cell. To effect this adjustment the plunger is first moved from the position normally closing the other end of the cell 15 slowly and continuously toward the lens 14 until the potentiometer 9 records an adjacent pair of maximum and minimum. The plunger 16 is next moved quickly to another position nearer the lens 14 and from this new position the plunger 16 is moved slowly and continuously toward the lens 14 until the potentiometer 9 records another adjacent pair of maximum and minimum. When the two pairs of adjacent maxima and minima are alike, this shows that the cell 15 is in proper position with respect to the transmitting horn 13 to refract radiation into the cell 15 which is parallel to the axis of the cell. However, if the two adjacent pairs are unlike, then the cell 15 with the lens 14 and plunger 16 are moved to another position in which the lens 14 is farther or nearer to the transmitting horn 13, whereupon the plunger 16 is then returned to the normal position, and then moved to record another two pairs of adjacent maxima and minima, as above described.

The air wave length of radiation in the cell 15 is next measured. To effect this the plunger 16 is first moved to its normal position, namely, closing the other end of the cell. Next, the plunger is moved slowly and continuously from the normal position to a position adjacent and spaced from the lens 14 and during this movement of the plunger 16 the series of maxima and minima are recorded on the potentiometer 9. Then the number of maxima on the potentiometer record are counted between the starting maximum and the stopping maximum of the plunger 16. The total counted number is then divided into the total distance moved by the plunger 16 from the starting maximum to the stopping maximum, and the resulting quotient is half the air wave length of the radiation being used.

After the air wave length has been measured, the space of the cell 15 intermediate the plunger 16 and the lens 14 is filled with the liquid to be measured by the opening of the valve 26 in the conduit 23 connected to a source of compressed air, and permitting the compressed air to enter the reservoir 18 and force the liquid into and fill said space. The liquid wave length is next measured. To effect this, the plunger 16 is moved slowly and continuously from the normal position to a position adjacent and spaced from the lens 14, and during this movement of the plunger 16 the series of maxima and minima are recorded on the potentiometer record, which series are counted between the starting maximum and the stopping maximum of the plunger 16. The total counted number is then divided into the total distance moved by the plunger 16 from the starting maximum to the stopping maximum, and the resulting quotient is half the liquid wave length of the radiation being used. A comparison between the wave patterns previously secured with air in the cell 15 and those just obtained with the liquid in such cell provides the data needed to compute the extinction coefficient of the liquid and the index of refraction of the liquid.

The extraction coefficient of the liquid is effected by the use of the following formula:

$$K = \frac{\lambda_0}{4\pi(a_2-a_1)} ln\left(\frac{I_{max\,1}-I_{min\,1}}{I_{max\,2}-I_{min\,2}}\right)$$

wherein $a_2$ and $a$, represent two plunger positions in the liquid, and several (a whole number) wave lengths apart. $I_{max\,1}$ and $I_{min\,1}$ are the bolometer maximum and minimum readings nearest $a_1$ and $I_{max\,2}$ and $I_{min\,2}$ are the corresponding bolometer outputs nearest to $a_2$.

To compute the index of refraction of the liquid, the air wave length obtained, and the liquid wave length obtained are substituted in the following formula:

$$N = \frac{\lambda_0}{\lambda_1}\left[\frac{\lambda_1^2 + \lambda_c^2}{\lambda_0^2 + \lambda_c^2}\right]^{1/2}$$

wherein $\lambda_c$ is the largest wave length that can exist in the cell, and $\lambda_0$ is the air wave length, and $\lambda_1$ is the liquid wave length.

It is to be noted that the space between the plunger 16 and the lens 14 may be varied by having the plunger at any selected position with respect to the lens. As above described, the plunger 16 is adjacent the lens 14, but it may be near or at the other end of the cell 15.

Referring to Figure 2, of the drawings, the numeral 30 indicates a first receiving horn for introducing any radiation into a first wave guide or tunnel in the form of a rectangular pipe 31, the pipe having one end attached to the horn. The other end of the pipe 31 is connected in communication with one end of a second wave guide or tunnel in the form of a rectangular pipe 32. As shown, a receiving paraboloid 28 is employed for introducing the radiation into the horn 30. It is to be understood that this radiation may be introduced into the wave guide or pipe 31 by means other than the paraboloid 28 and the cooperating horn 30. The other end of the wave guide or pipe 32 is connected in communication with a second horn 33 which is employed to serve as a transmitting horn. The large end of the horn 33 is in face to face spaced alignment with a plano-convex lens 34 which closes one end of a cell 35 which is adapted to contain the liquid to be measured, the one end of the cell being fixedly secured to the lens 34. The horn 33 and the lens 34 are spacedly mounted on a fixed platform 40 for adjustment relative to each other. The cell 35 has its other end fixedly closed by another plano-convex lens 36 which is fixedly supported on a platform 39. The body of the cell 35 is made wholly of a flexible material and is capable of being extended and contracted lengthwise. The lens 36 is positioned in face to face spaced alignment with respect to the larger end of a receiving horn 37 which is connected to a bolometer assembly 38 containing a Wollaston bolometer wire 38a. The receiving horn 37 and bolometer assembly 38 are mounted on a supporting block 42 which is movable with respect to the platform 39 for preliminary adjustment of the spaced alignment of lens 36 and horn 37. The Wollaston wire 38a is electrically connected through an amplifier 55 to a recording potentiometer 56. The platform 39 is mounted for movement toward and away from the platform 40 by means, not shown. A dial gauge 41 is positioned between the platforms 39 and 40, and is connected to the movable platform 39 and operatively connected to the fixed platform 40 or as shown to the lens 34. The cell 35 has an inlet 43 which is connected to a reservoir 45 containing a quantity of liquid to be measured by means of a conduit 44. In addition, the cell 35 is also provided with an outlet 47 which is connected to an auxiliary reservoir 49 by means of a conduit 48. The reservoir 45 has a conduit 50 connected to a source of compressed air, not shown, the conduit 50 having a control valve 46.

In operation of the apparatus according to Figure 2, the horn 33 is adjusted relative to the lens 34 by means not shown until the radiation within the cell 35 is substantially parallel to the axis of the cell, whereupon the lens 36 is adjusted relative to the horn 37 by causing movement of the base 42 on the platform 39 until the space between the lens 36 and the horn 37 is substantially the same as the space between the horn 33 and the lens 34. With the completion of the above defined adjustment, the platform 39 is moved relative to the platform 40 through a distance of several wave lengths in one direction, the output of the bolometer 38 is recorded on the potentiometer 56 as a series of maxima and minima. Then the number of maxima on the potentiometer record are counted between the starting maximum and the stopping maximum. The total counted number is then divided into the total distance moved by the platform 39 from the starting maximum to the stopping maximum, and the resulting quotient is half the air wave length of the radiation being used. The wave patterns further serve as a measure of the radiation intensity emerging from the cell 35 when no absorbing medium, such as a liquid, is present.

Next, the space of the cell 35 intermediate the lenses 34 and 36 is filled with liquid to be measured by opening the valve 46 in the conduit 50 and permitting the compressed air to enter the reservoir 45 and force the liquid into said space, whereupon the length of the liquid traversed by the radiation in the cell 35 between the lens 34 and the other end or lens 36 is caused to be increased or decreased by moving the platform 39 toward or away from the platform 40. As the length of the liquid is traversed by the radiation and is being increased or decreased, the liquid output of the bolometer 38 on the potentiometer 56 as a series of maxima and minima. Then the number of maxima and minima on the potentiometer record are counted between the starting maximum and the stopping maximum. The total counted number is then divided into the total distance moved by the platform 39 from the starting maximum and the stopping maximum, and the resulting quotient is half the liquid wave length of the radiation being used. A comparison between the wave patterns previously secured with air in the cell 35 and those just obtained with the liquid in such cell provides the data needed to compute the extinction coefficient of the liquid and the index of refraction of the liquid. The extinction coefficient and the index refraction are computed in the same manner as above described in connection with the cell 15.

Having thus described the invention what is new and desired to be secured by Letters Patent is:

1. Apparatus for determining complex index of liquid refraction comprising a cell having a lens closing one end thereof, a tunnel having a receiving end and a transmitting end arranged so that the transmitting end is in spaced alignment with respect to the cell lens, means operatively connected to the other end of said cell and movable toward and away from said lens for increasing or decreasing the space in said cell between the lens and the other end of the cell, and a bolometer arranged with respect to said lens so as to record radiation passing through said lens.

2. Apparatus for determining complex index of liquid refraction comprising a cell having a lens closing one end thereof, a tunnel having a receiving end and a transmitting end arranged so that the transmitting end is in spaced alignment with respect to the cell lens, a plunger closing the other end of said cell and movable toward and away from said lens for increasing or decreasing the space in said cell between the lens and the other end of the cell, and a bolometer arranged with respect to said lens so as to record radiation passing through said lens.

3. Apparatus for determining complex index of liquid refraction comprising a cell having an open ended body which is extendable and retractable, a lens closing one of the open ends of said body, a tunnel having a receiving end and a transmitting end arranged so that the transmitting end is in spaced alignment with respect to the cell lens, another lens closing the other end of said cell and movable toward and away from said lens for increasing or decreasing the space in said cell between the lens and the other end of the cell, and a bolometer arranged with respect to said another lens so as to record radiation passing through said another lens.

4. In a method for determining complex index of liquid refraction the steps providing an empty cell having one end closed by a lens, applying radiation to said cell, changing the length of said cell and measuring condition of radiation in said cell through maxima and minima conditions, and measuring the change in length of said cell at points of maxima and minima of energy radiated through said cell.

5. In a method of determining complex index of liquid refraction the steps of providing an empty cell having one end closed by a lens, providing a source of radiation confined in a tunnel having a transmitting end so that the transmitting end is in spaced alignment with respect to the cell lens, applying radiation to said cell, changing the length of said cell and measuring condition of radiation in said cell through maxima and minima conditions, and measuring the change in length of said cell at points of maxima and minima of energy radiated through said cell.

6. The method of determining complex index of liquid refraction which comprises providing an empty cell having an end closed by a lens, applying radiation to said cell, changing the length of said cell and measuring condition of radiation in said cell through maxima and minima conditions, measuring the change in length of said cell at points of maxima and minima of energy radiated through said cell, filling the space in said cell between the lens and the other end with a liquid to be measured, causing the length of liquid traversed by the radiation in said cell to be increased or decreased, measuring the liquid wave length of radiation in said cell as the length of liquid traversed by the radiation is being increased or decreased, comparing the measured air and liquid wave patterns, and computing the complex index of liquid refraction from said compared patterns.

7. The method for determining complex index of liquid refraction which comprises providing an empty cell having one end closed by a lens, providing a source of radiation confined in a tunnel having a transmitting end so that the transmitting end is in spaced alignment with the cell lens, applying radiation to said cell, changing the length of said cell and measuring condition of radiation in said cell through maxima and minima conditions, measuring the change in length of said cell at points of maxima and minima of energy radiated through said cell, filling the space in said cell between the lens and the the other end with a liquid to be measured, causing the length of liquid traversed by the radiation in the cell between the lens and the other end thereof to be increased or decreased, measuring the liquid wave length of radiation in said cell as the length of liquid traversed by the radiation is being increased or decreased, comparing the measured air and liquid wave patterns, and computing the complex index of liquid refraction from said compared patterns.

References Cited in the file of this patent

UNITED STATES PATENTS

| | | |
|---|---|---|
| 1,570,781 | Ruben | Jan. 26, 1926 |
| 2,457,673 | Hershberger | Dec. 28, 1948 |
| 2,474,260 | Leef | June 28, 1949 |
| 2,520,604 | Linder | Aug. 29, 1950 |
| 2,532,817 | Lafferty et al. | Dec. 5, 1950 |
| 2,659,860 | Breazeale | Nov. 7, 1953 |
| 2,671,884 | Zaleski | Mar. 9, 1954 |
| 2,792,548 | Hershberger | May 14, 1957 |

OTHER REFERENCES

Phillips: "The Permittivity of Air at a Wavelength of 10 cms.," Proc. of the IRE, vol. 38, July 1950, pp. 786–790.